Dec. 13, 1960 W. B. HANSEL ET AL 2,964,376
ODOGRAPH
Filed Feb. 16, 1956 3 Sheets-Sheet 1

INVENTORS
WILLIAM B. HANSEL &
EINAR T. YOUNG
BY
ATTORNEYS

INVENTORS
WILLIAM B. HANSEL &
EINAR T. YOUNG
ATTORNEYS

Dec. 13, 1960 W. B. HANSEL ET AL 2,964,376
ODOGRAPH
Filed Feb. 16, 1956 3 Sheets-Sheet 3

INVENTORS
WILLIAM B. HANSEL &
EINAR T. YOUNG
BY
ATTORNEYS

United States Patent Office 2,964,376
Patented Dec. 13, 1960

2,964,376

ODOGRAPH

William B. Hansel, Brookhaven, and Einar T. Young, Newtown Square, Pa., assignors to Sun Oil Company, Philadelphia, Pa., a corporation of New Jersey Filed Feb. 16, 1956, Ser. No. 565,948

6 Claims. (Cl. 346—138)

This invention relates to an odograph for the automatic plotting of the path traversed by a vehicle and has particular reference to the provision of an odograph having an extremely high degree of accuracy.

Many proposals have been made in the past for the construction of odographs for the automatic plotting of paths traversed by a supporting vehicle. In general, these have involved charts arranged to be driven in proportion to the linear advance of the carrying vehicle, together with provision of orienting means, such as a gyroscope or magnetic compass follower for establishing an azimuthal reference. However, these proposals have failed to achieve a high degree of plotting accuracy due primarily to reaction of the apparatus on the azimuthal reference means, such as a gyroscope, and effects of inertia producing a departure from the theoretical condition of a rolling contact occurring without relative sliding movement. It is the general object of the present invention to provide an odograph having the parts so arranged as to minimize the disturbing matters just indicated. Specifically, using a gyroscope for azimuthal reference, disturbing loads on the gyroscope are minimized so that the gyroscope will accurately maintain its azimuthal reference, or, as is usually the case, if it drifts the drift will be uniform and therefore correctible. Further, in accordance with the invention, balancing against inertial forces is achieved so as to secure an adequate approximation to a rolling contact, without relative sliding, between a driving roller and a drum or other element on which plotting is effected.

The foregoing and other objects particularly relating to details of construction and operation will become apparent from the following description read in conjunction with the accompanying drawings in which.

Figure 1:
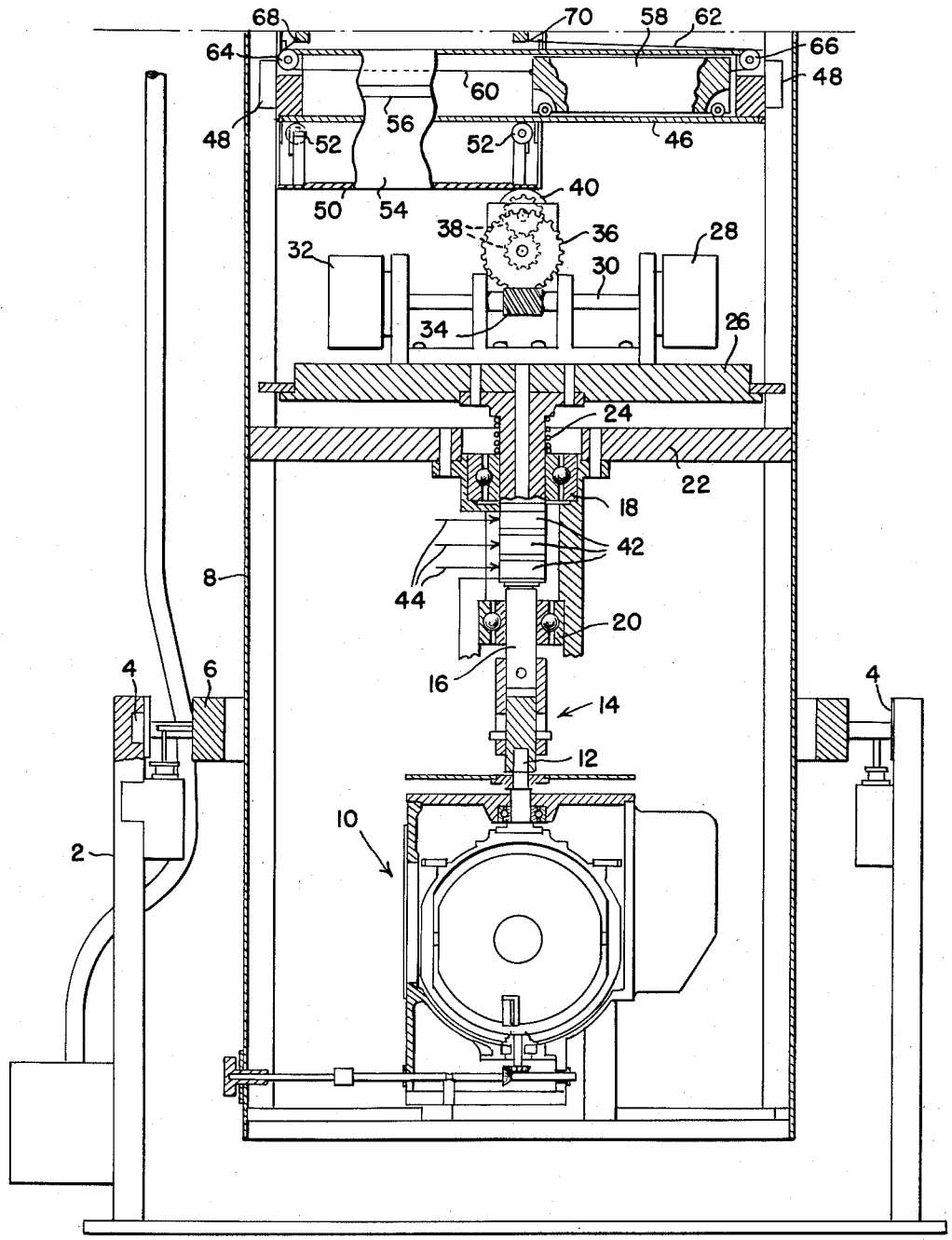
Figure 1 is a diagrammatic sectional view showing the lower portion of an odograph provided in accordance with the present invention.

Referring first to Figure 1, there is indicated at 2 a supporting frame arranged to be secured to the vehicle mounting the odograph. The vehicle may be a power driven one, or may be a trailer, depending upon the use to which the invention is put. Desirably the odograph assembly is mounted to maintain a definite position relative to the horizontal, particularly in view of the use of a gyroscope for maintaining azimuthal reference, and accordingly a gimbal 6 is mounted on trunnions supported by bearings 4 and in the gimbal 6 there is supported, by trunnions defining an axis perpendicular to that defined by the first mentioned trunnions, a frame 8 which supports the odograph assembly proper.

A gyroscope of conventional type is mounted in the frame 8 and is indicated at 10. Mounting of the gyroscope rotor is effected in the usual fashion by gimbals, and the vertical output shaft which is desirably maintained in fixed azimuthal position is indicated at 12. Theoretically, this shaft should maintain a fixed position, but, practically, it will be subject to drift, and either the final plot will be corrected for such drift, or the drift will be compensated in some fashion which forms no part of the present invention. So far as the present invention is concerned, however, provision is made for avoiding, as far as possible, load on the shaft 12. Loading of the shaft 12 would have a deleterious effect in producing drift and, particularly, irregular drift, since any appreciable loading which might occur would be usually varied by inertial forces resulting from irregularities in the roadway traversed which would set up vibrations of irregular type in the system. In accordance with the present invention, the shaft 12 is required to exert a minimum of effort and in turn is subjected to a minimum of forces which might arise due to inertial disturbances. For this purpose, it is coupled by means of a coupling arrangement indicated at 14 to a shaft 16 which is mounted securely in anti-friction bearings 18 and 20 supported by a fixed member 22 of the support 8. The coupling 14 is so arranged, by a splined pin and slot type of connection, so that axial movements of the shaft 16 are not imparted to the gyroscope output shaft 12. Axial loading of the shaft 12 is thus prevented and the shaft 12 is used only to restrain against rotational movements about a vertical axis a relatively light assemblage of elements. As will appear these elements are subject only to very small torques about the vertical axis.

A spring 24 urges the shaft 16 upwardly and with it the mounting plate 26 which supports a pair of servo motors 28 and 32 which may conveniently be of the selsyn type. The output shaft 30 of the servo motors 28 and 32 drives through a worm and wheel arrangement 34, 36 and gearing 38 a drive roller 40 which is urged by the spring 24 into contact with a drum. The drive roller desirably has a spherical driving periphery to provide a good approximation to a point contact between the roller and the cylindrical surface of the drum. The use of two servo motors not only effects balance of inertial forces but also makes possible the use of two small motors rather than a single larger one which in any event, would require counterbalancing. The torque required from the motors is so small that amplification at their inputs is unnecessary.

The shaft 16 carries a series of slip rings 42 through which current is supplied to the servo motors 28 and 32 through brushes indicated at 44.

Figure 2:
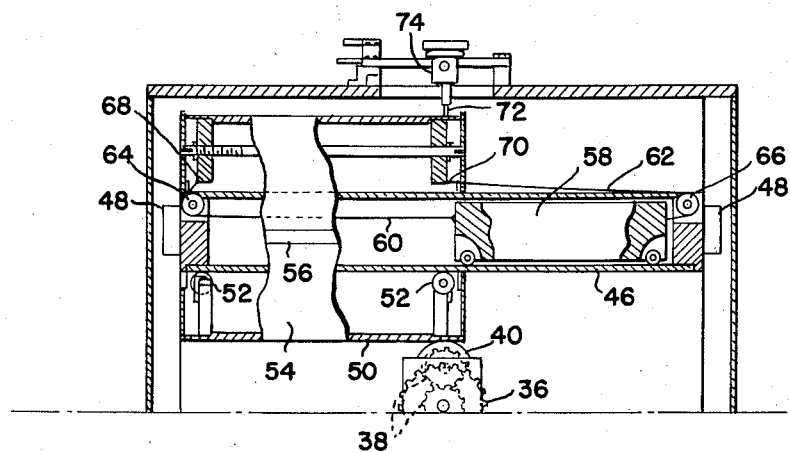
Figure 2 is a continuation of the upper portion of Figure 1.

Mounted about a horizontal axis in the frame 8 by means of bearings indicated at 48 there is a sleeve member 46 on which there is mounted for axial movement a chart-carrying drum 50 by means of a series of anti-friction rollers 52. The drum 50 mounts the cylindrical paper chart 54 by means of a clamping means indicated at 56, the paper chart being secured thereon over a portion of the drum periphery which in operation is not engaged by the roller 40. Mounted to slide axially in the sleeve 46 is a roller-supported counterweight 58 which is connected by cables 60 and 62 passing about pulleys 64 and 66 mounted in the sleeve to the anchorages 68 and 70 adjustably secured within the drum 50. As will be evident from the arrangement shown, if the drum moves to the right as indicated in Figure 2, the counterweight 58 will move correspondingly to the left. The result is not only maintenance of balance about all horizontal axes, but also inertial compensation of accelerations in the direction of the common axis of the sleeve 46 and drum 50. With the sleeve 46 mounted in its bearings 48 so as to be restrained against axial movement relative to the frame 8, it will be evident that, if the counterweight 58 has the same mass as the drum 50 and the parts carried thereby, such axial accelerations cannot produce any movements of the drum in view of the compensation afforded by the counterweight 58. Accordingly there can be no slippage, due to inertial forces, between the drum 50 and the driving roller 40.

Figure 3:
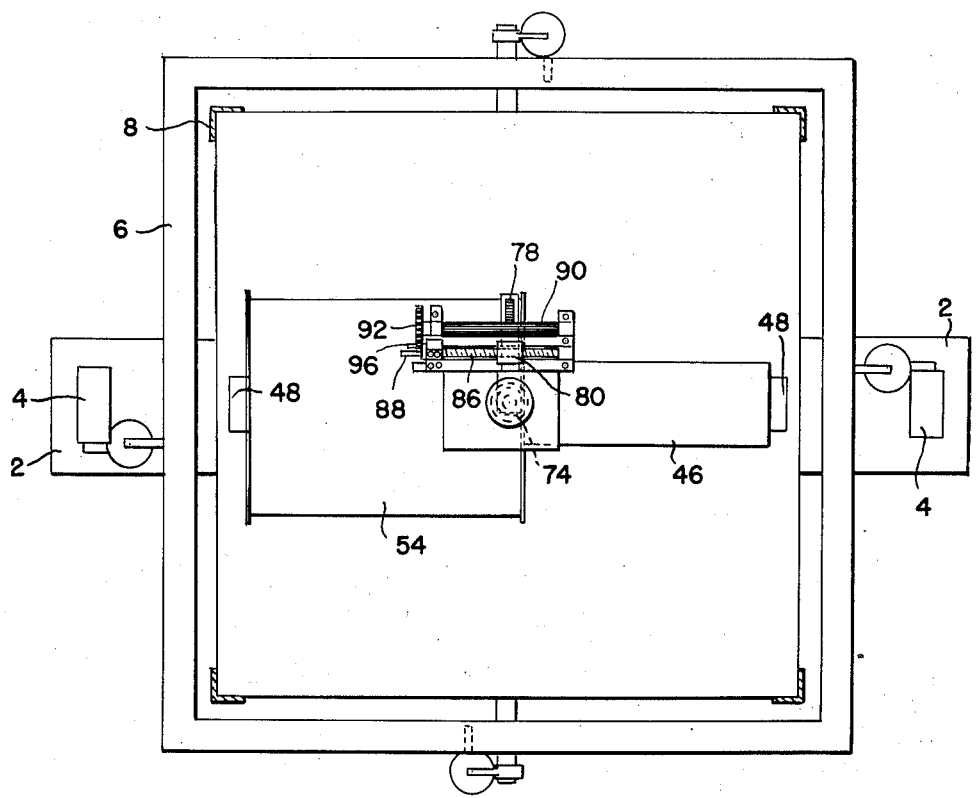
Figure 3 is a plan view showing, in particular, the association of a stylus with a record drum.

Substantially diametrically opposite the point of contact of the roller 40 with the drum 50 there is located the marking stylus 72 mounted in an adjustable slide 74 and urged into contact with the chart 54 by means of a spring 76. The member 74 is provided with a rack 78 which is slidably mounted in a crosshead 80 which is adjustable along tracks 82 and 84 secured to the frame 8 by means of a screw 86 which may be adjusted by its spindle extension 88. The rack 78 is engageable by a pinion 90 of elongated form as will be clear from Figure 3, the pinion 90 being adjustable through the gearing arrangement indicated at 92 and 94 from a spindle 96. The arrangement just described provides adjustment in rectangular coordinate directions of the stylus 72 with respect to the chart 54. These adjustments are provided for the convenient setting of the stylus in definite starting position with respect to the chart 54. It may be assumed, for purpose of description, that the contact of stylus 72 with the chart is essentially in vertical alignment with the point of contact of roller 40 with the drum. It will be evident, however, this need not be strictly true consistent with the plotting of the proper path of movement of the vehicle.

Figures 4, 5, 6:
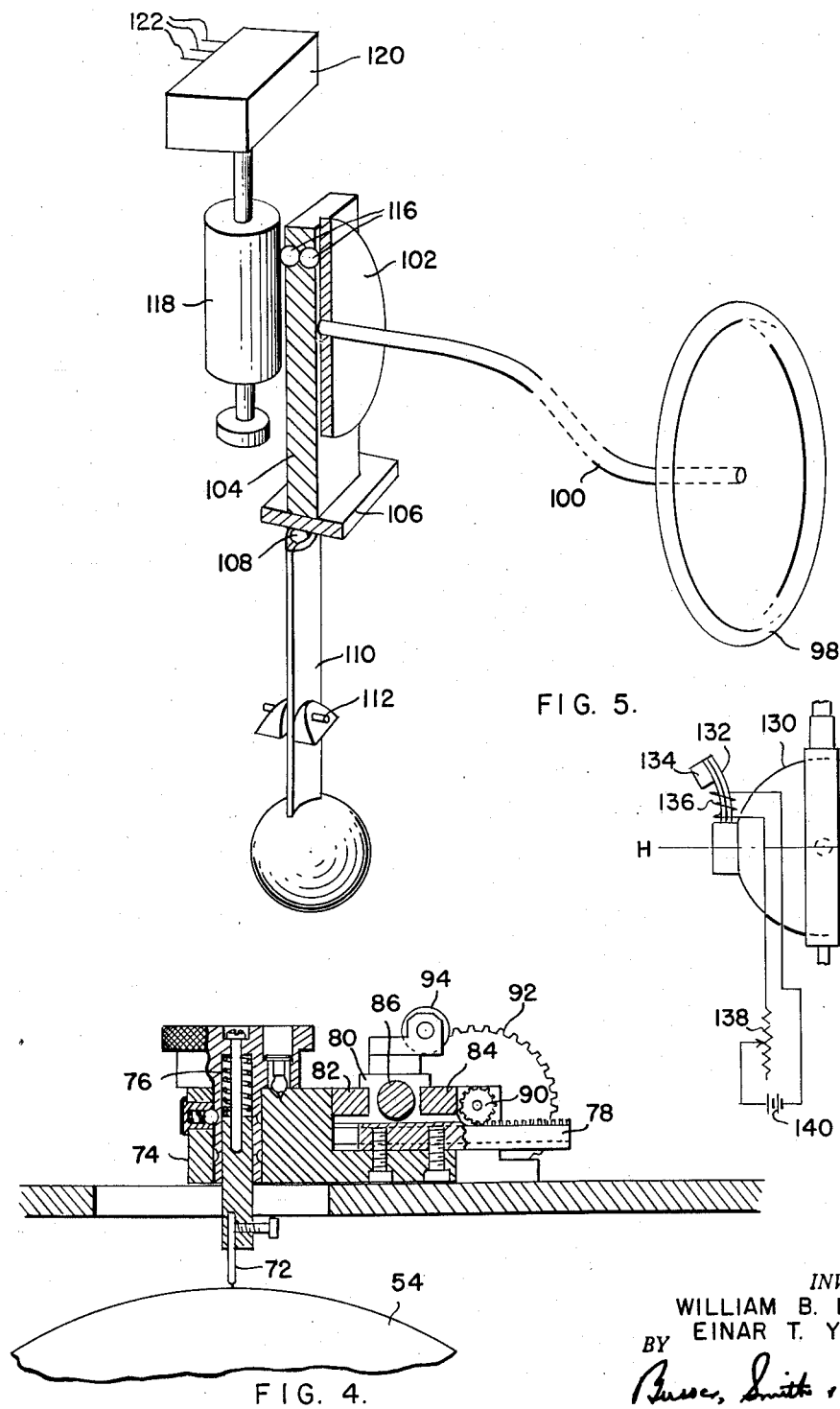
Figure 4 is a sectional view showing details of the stylus mounting and adjusting means.
Figure 5 is a diagrammatic perspective view showing means for making correction for slope of the roadway so as to provide a plot of the vertical projection of the traversed path.
Figure 6 is a diagram illustrating means desirably employed for gyroscope drift correction.

Drive of the servo motors 28 and 32, and consequently of the roller 40, is desirably effected, with compensation for the inclination of the roadway, by an arrangement such as diagrammed in Figure 5. The wheel 98, of definite circumference, is arranged to engage the roadway and drives through any suitable connections such as indicated at 100 as a flexible shaft, a disc 102. A slide 104 mounted for movement relative to the vehicle in a vertical direction when the vehicle is horizontal is provided with a plate 106 engaging under downward action of a spring (not shown) a ball 108 carried by the upper end of a pendulum 110 supported by a fixed pivot means 112 for oscillation in the plane vertically extending along the axis of direction of movement of the vehicle. A pair of balls 116 mounted in the slide 104 are tightly engaged between the disc 102 and a cylinder 118 the axis of which is parallel to the direction of sliding movement of the slide 104. The cylinder 118 in turn drives the servo transmitter 120, which may be a selsyn transmitter, and which provides current output through leads 122 to the brushes 44 to provide driving current to the servo motor 28. The arrangement illustrated in Figure 5 is not part of the present invention, but, as will be obvious, provides a correction of the drive imparted from wheel 98 to the transmitter 120 in accordance with the cosine of the angle of inclination of the roadway. Accordingly the movements of the roller 40 are proportional to the horizontal component of the actual path taken by the mounting vehicle.

The operation of the odograph will now be clear. Assuming that the gyroscope shaft 12 maintains an azimuthal reference, the relative skew relationship between the roller 40 and the chart 54 corresponds to the azimuthal direction of movement of the vehicle with respect to the reference. The roller 40 is driven in accordance with the horizontal component of the displacement of the vehicle along its roadway and imparts movement to the chart 54 proportional to this component and entailing possible components of motion of the chart 54 about the axis of drum 50 and along that axis. The movement of the chart relative to the stylus in turn corresponds to this so that there is traced on the chart 54 a map to reduced scale of the horizontal components of movement of the vehicle.

The roller 40 is maintained in tight engagement with the drum 50 by means of the spring 24. Assuming no slippage from the standpoint of rotation of the roller 40, the map which is drawn will be accurate. Actually by maintenance of a tight contact such slippage can be avoided. In accordance with the present invention, furthermore, slippage due to inertial sources is essentially eliminated because of the complete balance of the drum 50. By reason of its concentric arrangement and balance about the axis of bearings 48 circumferential slippage between the drum 50 and the roller 40 is eliminated. Slippage in the direction of the axis defined by bearings 48 is avoided by virtue of the balancing of the drum by means of the counterweight 58. High accuracy of mapping due to drive of the drum by the roller 40 is accordingly secured.

Furthermore, in view of the minimizing of forces applied to the shaft 12 the gyroscope is able to maintain its reference azimuth to a high degree of accuracy or to a high degree of correctibility, the drift, if any, being substantially constant. Vertical loading on the shaft 12 is prevented by the splined connection indicated at 14. Since the shaft 16 and all of the parts carried thereby are balanced about the vertical axis of the shaft, torques due to inertia are substantially eliminated from application to the shaft 12. The contacts of the brushes 44 with the slip rings 42 may be made very light and substantially devoid of friction so that frictional disturbance due to these is negligible. The only other friction involved is that of the roller 40 against the drum 50 opposing relative turning about the vertical axis of shaft 16. However, the contact between roller 40 and the chart is essentially point contact at the axis of shaft 16, and even though the pressure force exerted between the roller and the chart by spring 24 may be substantial, the lever arm of such force is practically zero. The result is a minimum of forces acting in any fashion on the shaft 12 so that the gyroscope is practically operating free of restraint or disturbances so that the azimuthal reference is defined or determinable to a very high degree of accuracy.

It is desirable in an odograph of the type described to provide for correction of gyroscope drift. It has been found that the drift of a gyroscope in an apparatus of this type is a function of ambient temperature and will change throughout a day and it is therefore desirable to provide automatic compensation which will at least minimize the drift. Figure 6 shows in diagrammatic fashion a simple and convenient means for accomplishing this end. The housing 130 mounted in the vertical gimbal contains the gyroscope rotor, the spin axis being indicated at H—H. At one end of this axis the casing may be provided with a mounting for a bimetallic strip 132 mounting an overhanging weight 134 and surrounded by a heating resistance coil 136 which is in series with a rheostat 138 and a source of current such as battery 140. Through the use of this arrangement, which is so set that some current is required to flow even at the highest ambient temperatures to eliminate drift, changes in ambient temperature will result in displacement of the weight 134 in the direction of the axis H—H to provide a torque which, by tending to tilt the gyroscope rotor will set up a precessional force sufficient to counterbalance the drift and thus serve, at least partially, to minimize the drift. Not only is such force set up by reason of the ambient temperature changes, but it may also be controlled by control of current through the heating coil.

It will be evident that various changes may be made in specific details of the apparatus shown without departing from the invention as defined in the following claims.

What is claimed is:

1. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact, means for maintaining substantially constant the azimuthal position of said support about its axis of rotation, inertia means mounted for movement along the axis of said cylindrical surface, and means connecting the last means to said member to enforce opposite movements thereof of the same extent, along the axis of said cylindrical surface, the last named means and said member having substantially equal masses.

2. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact, means for maintaining substantially constant the azimuthal position of said support about its axis of rotation, inertia means mounted for movement along the axis of said cylindrical surface, and means connecting the last means to said member to enforce opposite movements thereof of the same extent along the axis of said cylindrical surface, the last named means and said member having substantially equal masses, symmetrically disposed at all times about the axis of rotation of said support.

3. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact means for maintaining substantially constant the azimuthal position of said support about its axis of rotation, inertia means mounted for movement along the axis of said cylindrical surface, and flexible cable means connecting the last means to said member to enforce opposite movements thereof of the same extent along the axis of said cylindrical surface, the last named means and said member having substantially equal masses.

4. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact, means for maintaining substantially constant the azimuthal position of said support about its axis of rotation, inertia means mounted for movement along the axis of said cylindrical surface and flexible cable means connecting the last means to said member to enforce opposite movements thereof of the same extent along the axis of said cylindrical surface, the last named means and said member having substantially equal masses, symmetrically disposed at all times about the axis of rotation of said support.

5. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact, means for maintaining substantially constant the azimuthal position of said support about its axis of rotation, a connection between the last mentioned means and said support including means preventing transmission to the last mentioned means of forces from said support directed along its axis of rotation, inertia means mounted for movement along the axis of said cylindrical surface, and means connecting the last means to said member to enforce opposite movement thereof of the same extent along the axis of said cylindrical surface, the last named means and said member having substantially equal masses.

6. In an odograph, a member providing a cylindrical surface, means mounting said member for movement axially of and rotatably about the axis of said surface, a support, a driving roller mounted on the support to have an approximately point contact with the cylindrical surface of said member, means for driving said roller, means mounting said support for rotation about an axis substantially perpendicular to the axis of said cylindrical surface through said point contact, means for maintaining substantially constant the azimuthal position of said support about its axis of rotation, a connection between the last mentioned means and said support including means preventing transmission to the last mentioned means of forces from said support directed along its axis of rotation, inertia means mounted for movement along the axis of said cylindrical surface, and means connecting the last means to said member to enforce opposite movements thereof of the same extent along the axis of said cylindrical surface, the last named means and said member having substantially equal masses, symmetrically disposed at all times about the axis of rotation of said support.

References Cited in the file of this patent

UNITED STATES PATENTS

| Number | Name | Date |
|---|---|---|
| 1,785,241 | Bates | Dec. 16, 1930 |
| 2,078,763 | Hubbard | Apr. 27, 1937 |
| 2,209,735 | Lauck | July 30, 1940 |
| 2,346,798 | Summers | Apr. 18, 1944 |
| 2,357,381 | Carlson | Sept. 5, 1944 |
| 2,395,351 | Sohn | Feb. 19, 1946 |
| 2,582,374 | Dalke | Jan. 15, 1952 |
| 2,584,149 | Moffitt et al. | Feb. 5, 1952 |
| 2,612,428 | Vroom | Sept. 30, 1952 |
| 2,727,801 | Skillman | Dec. 20, 1955 |
| 2,750,248 | Abraham | June 12, 1956 |
| 2,826,476 | Jones | Mar. 11, 1958 |